United States Patent [19]

Jourdain et al.

[11] Patent Number: 5,571,883
[45] Date of Patent: Nov. 5, 1996

[54] ELASTOMERIC VEHICLE VIBRATION DAMPING DEVICES

[75] Inventors: Eric P. Jourdain, Houston; Periagaram S. Ravishankar, Kingwood, both of Tex.

[73] Assignee: Exxon Chemical Patents Inc., Wilmington, Del.

[21] Appl. No.: 490,274

[22] Filed: Jun. 14, 1995

[51] Int. Cl.$^6$ .................................................. C08F 210/18
[52] U.S. Cl. .......................... 526/282; 524/570; 526/336; 526/339; 526/348; 526/916; 526/938
[58] Field of Search .................................. 526/282, 348, 526/916, 938, 336, 339; 525/240

[56] References Cited

U.S. PATENT DOCUMENTS 4,882,406  11/1989  Cozewith et al. ....................... 526/283

FOREIGN PATENT DOCUMENTS

| | | |
|---|---|---|
| 0094051 | 6/1983 | European Pat. Off. . |
| S61-151758 | 1/1988 | Japan . |
| S62-210169 | 3/1989 | Japan . |

*Primary Examiner*—Fred Zitomer
*Attorney, Agent, or Firm*—Douglas W. Miller

[57] ABSTRACT

Motor vehicle vibration damping parts based on an ethylene, alpha-olefin, vinyl norbornene elastomeric polymer are manufactured with more efficiency due to vibration damping part compounds having lower viscosity, easier processing than ethylene, alpha-olefins, diene monomer compounds, where the diene monomer is other than vinyl norbornene. Additionally, the engine mounts or other vibration damping parts based on the ethylene, alpha-olefin, vinyl norbornene elastomeric polymer have better heat aging characteristics than natural rubber, when temperature of service exceed 120° C., maintain more constant dynamic characteristics of the mount when running at elevated temperature like 120° C. Finally the engine mounts or other vibration damping parts based on the ethylene, alpha-olefin, vinyl norbornene elastomeric polymer can be manufactured with compound containing less peroxide as curing agent, than ethylene, alpha-olefins, diene monomer compounds, where the diene monomer is other than vinyl norbornene. Those engine mounts or other vibration damping parts based on the ethylene, alpha-olefin, vinyl norbornene elastomeric polymer provide better aging properties so the service life of the parts are greatly extended vs. natural rubber part.

10 Claims, 1 Drawing Sheet

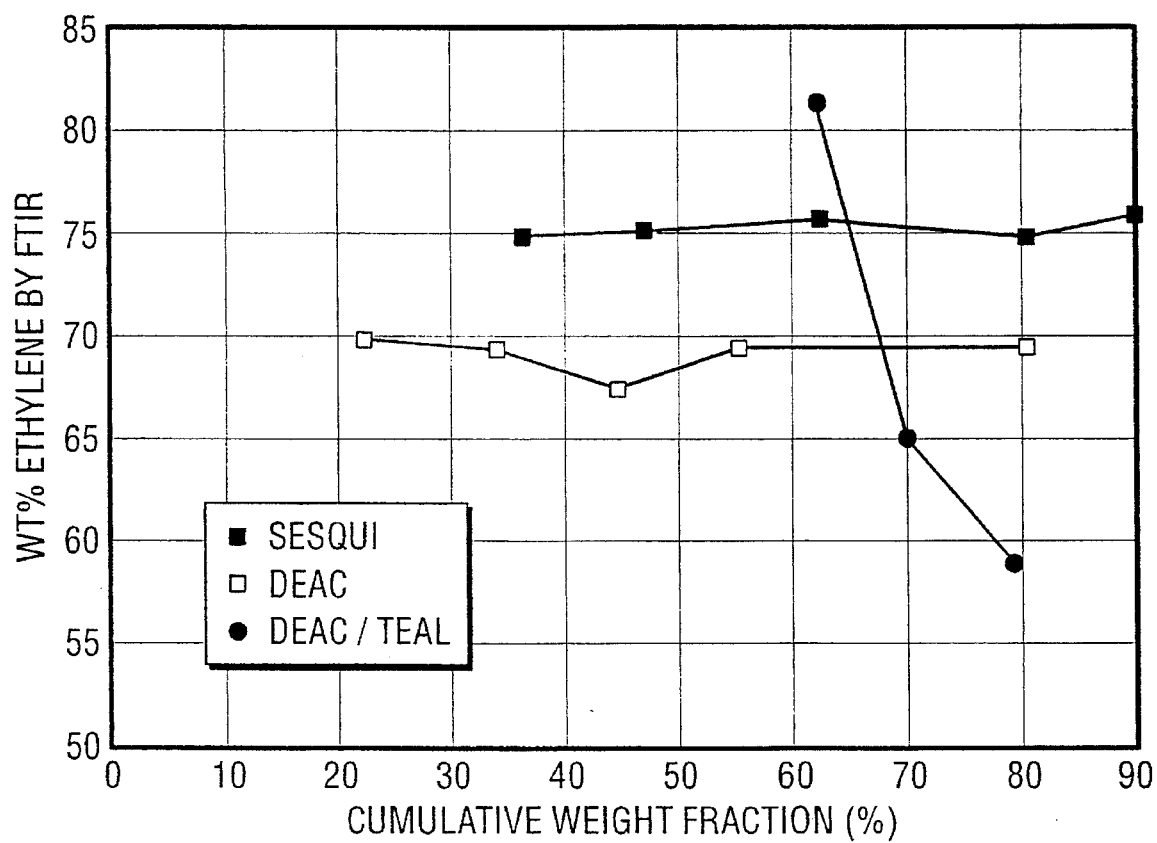

ELASTOMERIC VEHICLE VIBRATION DAMPING DEVICES

TECHNICAL FIELD

Various embodiments of the present invention generally pertain to the field of vehicle vibration damping articles. More particularly, the present invention is directed to vehicle vibration damping utilizing elastomeric polymer compounds, displaying improved processability, improved high temperature aging, and improved cure characteristics. These elastomeric polymers are generally of the ethylene, alpha-olefin, vinyl norbornene type.

BACKGROUND

Vibration damping devices for vehicles, such as engine mounts, transmission mounts, bushings, chassis/suspension insulators, and the like are used in motor vehicles for many reasons, among these reasons are insulating drivers and passengers from engine vibrations, engine noise, and road noise. Recent general trends in motors vehicles, particularly automobiles, have been that the size of vehicles is getting smaller compared to the automobiles generally available during the first three quarters of the 20th century. Additionally, the vehicles are becoming more aerodynamically designed. These two factors, among others, generally make the engine compartments of today's motor vehicles smaller than engine compartments of earlier automobiles. Even with the decreasing size of engine compartments, more functions and equipment are finding their way into the engine compartment. Additionally, today's smaller engines with higher revolutions and more torque are now powering vehicles.

The combination of these factors lead to higher and higher temperatures in the engine compartment or under the hood of a motor vehicle. Such increasing temperatures put additional stresses on parts in the engine compartment. As an example, in Northern latitudes, extreme low ambient temperatures will be experienced by majority of the components in the automobile. At those low temperatures, the rubber parts must retain much of their original flexibility to insure correct function. Upon starting and after warm-up, the engine compartment temperature, will be substantially the same in most latitudes. Accordingly, the low temperature performance specification for most automobile parts is generally fixed by the most extreme ambient conditions, while the high temperature specification has increased due to the factors mentioned above, and usually is fixed by the running temperature of the engine.

The engine compartment temperature of today's motor vehicles may reach 120° C. and generally when the vehicle stops after operation and no cooling is exerted from the outside air flow as would be experienced during moving operation, the engine compartment temperatures often may reach 140° C. or even 150° C. Such temperature extremes (high and low), whether endured for a relatively short period of time such as in daily vehicle use, or especially, endured repeatedly for long periods during the vehicle life, put additional stress or demands upon all parts in an engine compartment. Elastomeric compounds for engine compartment use must first function at these temperatures and further must retain a useful life over all or a majority part of the vehicular life which may extend to 10 years or more than 150 thousand miles.

A long life at severe temperature extremes, means generally exposure or aging at high temperature which can be detrimental to materials such as elastomeric parts used in the automobile, and lead part suppliers and vehicle manufacturers to search for materials which will, when fabricated into vibration or noise dampening parts, perform the same function or perhaps even have improved performance at broader temperature ranges, under more severe conditions.

In the past, most vibration dampening devices have been manufactured from compounds based on natural rubber. Natural rubber has been preferred because of its generally high molecular weight, which makes it very resilient. Additionally, even with a low level of reinforcing filler generally used to provide a high resiliency to the part, natural rubber was able to satisfy the severe physical property requirements of the dampening devices. Natural rubber's self-plasticizing charcteristic at compounding temperatures allows a low level of oil or plasticizer in the engine mount compounds while being processable (mixing and molding) by conventional machines. So elastomer compounds targeted to replace natural rubber compounds must generally utilize a combination of relatively low level of reinforcing filler, and low oil or plasticizer, still maintaining adequate compounding parameters, and deliver similar dynamic physical properties as natural rubber, but at a substantially higher service temperature. Most natural rubber compounds have performed relatively well when engine compartment temperatures were in the range of about 80° C. to about 110° C. Their physical properties, after aging or use, either in a vehicle or in testing intended to simulate the environment of an automobile, begin to drop off generally above about 80°–110° C. These properties include, low hysterisis or high resilience featuring a low viscous modulus at vibration frequencies comprised between 10–200 Hz, a low increase of the elastic modulus when the vibration frequence increases, a good creep resistance, a resistance to stiffening at low temperatures, a high tear resistance, and good compression set at elevated temperature.

In the recent past, ethylene, alpha-olefin, non-conjugated diene, elastomeric polymer based compounds have often been suggested as replacements for the majority of the natural rubber based under the hood parts, particularly in the critical applications such as engine mounts because the ethylene, alpha-olefin, non-conjugated diene elastomeric polymers generally maintain physical properties at higher temperature and keep a substantial measure of those properties after long term, high temperature aging.

Additionally, temperature resistance beyond 120° C. can generally only be obtained with a cure system which provides higher crosslink energy than the sulfur cure system. Examples of such better performing cure systems are resin cure, radiation cure or peroxide cure. The most suitable and efficient for an economic and industrial molding cycle is the peroxide cure system which provides temperature resistance up to 160° C. These peroxide cure system are not compatible with the natural rubber since a depolymerization occurs, but are particularly efficient with ethylene, alpha-olefin, non-conjugated diene, elastomeric polymer, because of their chemical structure giving carbon to carbon link after the action of free radical species generated by the decomposition of the peroxide present in the compound as crosslinking agent.

However, most of the currently available ethylene, alpha-olefin, non-conjugated diene, elastomeric polymer compounds contain a diene monomer selected from the group consisting of 5-ethylidene-2-norbornene, 1,4-hexadiene, 1,6 octadiene, 5-methyl-1,4 hexadiene, 3,7-dimethyl-1,6-octadiene, or combinations thereof.

The processability of compounds made from such elastomeric polymers intended for use as engine mounts, may not be optimum, because the molecular weight necessary to provide a similar low hysterisis to natural rubber is generally so high as to potentially interfere with the compounding, especially given the additional limitations placed on these compounds of generally little liquid plasticizer or oil, and relatively little reinforcing filler that can be used to formulate the compound. As these ethylene, alpha-olefin, non-conjugated diene, elastomeric polymer compounds are generally formulated with elastomeric polymer, carbon black, plasticizer, process aids, curatives, and other additives known to those of ordinary skill in the art, with low levels of liquid plasticizers and/or oils the polymer has the double role of being the plasticizing agent during the processing of the compound and providing the best of its elastic properties once cured.

The processability of a given elastomeric polymer or elastomeric polymer compound is of importance in the manufacture of vibration damping devices such as engine mounts for consistency and general quality of production. A material which displays generally a lower viscosity at compounding and molding temperatures without the tendency to prematurely cure or scorch, would be desirable because relatively high viscosity elastomeric polymers cannot get processing assistance (i.e. substantial viscosity lowering) from large amounts of oil or plasticizer.

Improvements in vibration damping part manufacturing economics while maintaining part quality are goals of many part manufacturers. Economies of scale in such a molding operation might include larger presses, and larger molds with more cavities (more parts) to accommodate the larger presses, but such methods are capital intensive and most fabricators might look for other methods to improve economics. Regardless of the methods used, the processability of an elastomeric polymer compound can have a substantial impact on these economies.

A lower compound viscosity could equate to improved ease of compounding and even more mold cavities filled faster. A faster part cure rate could lead to decreased molding cycle times (premature cure or scorch during mold filling is generally to be avoided), another process improvement that could also lead to economies. Both the lower viscosity and faster cure rate could beneficially impact fabrication economics. However, as explained above, a lower compound viscosity for a given elastomeric polymer, will generally be limited by the viscosity of the elastomeric polymer base of the compound during the compounding step, lack of substantial quantity of oil or plasticizer. Further, faster, more complete cures can be had only within very small limits for a given elastomeric polymer, by the type of or amount of curative, and the heat transfer in the mold. For a given elastomeric polymer compound such moves are often restricted by the inherent properties of the elastomeric polymer such as crosslink mechanism and curative type. However, the compounder will often have to compromise between higher levels of curative, which may deliver faster and or more complete cures, and premature scorch. Premature scorch can lead to incomplete mold cavity filling and defects in the part, which is critical for the dynamic characteristics of the part. Additionally, attempting to increase heat transfer can also lead to the same problems and defects.

There is a commercial need, therefore, for an elastomer which, when compounded, can provide vibration dampening parts which have improved resistance to high temperature of service before and after long term aging, maintain low temperature flexibility, have a low hysterisis( high resiliency) at different temperature of service and after aging under a range of frequencies typical of an automotive engine (comprised between 10 to 200 Hz), good resistance to creep, while having improved compound processability as measured by viscosity at high shear and injection temperatures, improved cure rates as measured by time to cure after a mold is filled, and improved or higher cure states.

SUMMARY

We have discovered that engine mounts, transmissions mounts, chassis/suspension, bushings, steering wheel damper, exhaust mounts, drive shaft dampers, strut mounts, crankshaft pulley, leafspring dampers, radiator mounts designed as dense rubber part or hydromounts part (assembly of dense rubber and liquid filed in a cavity) used in some of above applications, and the like,with a rubber portion made from a compound including an ethylene, alpha-olefin, vinyl norbornene elastomeric polymer will generally have improved resistance to physical property deterioration during or after high temperature aging, will maintain good low temperature performance, will have low hysterisis and high resiliency, good resistance to creep, have good compression set, and will demonstrate good compound processability, comparable to vibration damping parts made from natural rubber.

Additionally the ethylene, alpha-olefin, vinyl norbornene elastomeric polymers of various embodiments of our invention and vehicle vibration damping components made from compounds based on these elastomeric polymers will also have generally a faster cure rate when cured by peroxide, and improved cure state over elastomeric polymers containing dienes other than vinyl norbornene.

The vehicle engine mount parts will comprise an ethylene, alpha-olefin, vinyl norbornene elastomeric polymer, wherein a compound made utilizing such an elastomeric polymer has: a) Mooney viscosity (ML 1+4 100° C.) up to about 80, b) maximum cure state MH-ML (as determined by a Monsanto oscillating disc rheometer (ODR) 2000@180° C.,±3° arc) of at least about 50 daN.m, c) a cure rate measured in the same conditions by the ODR of at least about 15 daN.m/min., d) a modulus@100% elongation of less than about 3 MPa measured on pads cured 10 minutes @180° C., e) a compression set at 22 hours (22H) at 125° C. up to about 10% when measured on button cured 12 minutes@180° C. and compressed by 25%, f) a compression set at 22 hours (22H) at 150° C. up to about 15% when tested in same condition as f), g) a loss tangent at room temperature below about 0.20 at 15 Hz and 0.16 at 100 Hz, h) loss tangent at 80° C. below about 0.20 at 15 Hz and 0.16 at 100 Hz, i) a loss tangent at 125° C. below about 0.20 at 15 Hz and 0.16 at 100 Hz, j) a glass transition temperature of about −43° C., k) an elastic modulus at room temperature up to about 800 N/mm at 15 Hz and 900 N/mm at 100 Hz, I) a viscous modulus at room temperature below about 1.5 N.sec./mm at 15 Hz and 0.15 at 100 Hz, m) an elastic modulus at 80° C. up to about 400 N/mm at 15 Hz and 500 at 100 Hz, n) a viscous modulus at 80° C. up to about 1.0N.sec/mm at 15 Hz and 0.20 at 100 Hz, o) an elastic modulus at 125° C. up to about 400 N/mm at 15 Hz and 500 at 100 Hz, p) a viscous modulus at 125° C. up to about 0.7N.sec./mm at 15 Hz and 0.15 at 100 Hz.

BRIEF DESCRIPTION OF THE DRAWINGS

These and other features, aspects, and advantages of the present invention will become better understood with reference with the following description, appended claims, and accompanying drawings where:

FIG. 1 shows co-catalyst influence on polymer compositional distribution.

DESCRIPTION

Various embodiment of our present invention concern certain classes of fabricated ethylene, alpha-olefin, vinyl norbornene elastomeric polymer articles and their uses. These articles have unique characteristics which make them particularly well suited for use in certain applications. Vibration damping parts, such as engine mounts, transmissions mounts, chassis/suspension, bushings, steering wheel damper, exhaust mounts, drive shaft dampers, strut mounts, crankshaft pulley, leafspring dampers, radiator mounts designed as dense rubber part or hydromounts part (an assembly of dense rubber and liquid filed in a cavity) used in some of above mentioned applications, and the like, with a rubber portion made from these compounds, exhibit improved resistance to deterioration in long term heat aging tests over vibration damping devices based on molded and/or extruded parts made from previously available materials, such as natural rubber or ethylene, alpha-olefin, non-conjugated diene elastomeric polymers, where the ethylene, alpha-olefin, non conjugated diene elastomeric polymers contain, a non-conjugated diene is selected from the group consisting of 5-ethylidene-2-norbornene, 1,4-hexadiene, 1,6-octadiene, 5-methyl-1,4 hexadiene, 3,7-dimethyl- 1,6-octadiene, or combinations thereof and compounds derived from them. A detailed description of certain preferred elastomeric polymers for use in fabricating vibration damping devices, that are within the scope of our invention, preferred methods of producing the elastomers, and the preferred applications of the molded or extruded parts follow.

Those skilled in the art will appreciate the numerous modifications to these preferred embodiments can be made without departing from the scope of the invention. For example, although the properties of engine mounts are used to exemplify the attributes of the elastomeric polymers of the present invention, the elastomeric polymers have numerous other vibration damping uses. To the extent that our description is specific, this is solely for the purpose of illustrating preferred embodiments of our invention and should not be taken as limiting our invention to these specific embodiments.

The use of subheadings in the description is intended to assist the reader and is not intended to limit the scope of our invention in any way.

| Definitions and Test Methods: | | |
|---|---|---|
| Test | Unit | Test Method |
| Mooney Viscosity, ML1 + 4, 125° C. | Mooney | ASTM D 1646 |
| Mooney Relaxation (MLR) | MU.S | ASTM D 1646 |
| Plasticity Retention Index - N.R. | min., % | ASTM D 3194 |
| (elastomeric polymer content determination) | % | ASTM D 3900 |
| Ethylene (weight %) | | |
| Ethylidene Norbornene (weight %) | % | FT - Infra Red* |
| Vinyl Norbornene (weight %) | % | FT - Infra Red |
| Mooney Viscosity, ML1 + 4, 100° C. (compound) | Mooney | ASTM D 1646 |
| Mooney Scorch Time, T5, 125° C. | minute | ASTM D 1646 |
| Oscillating Disc Rhemeter (ODR), 180° C. ± 3° arc | | ASTM D 2084 |
| Minimun ML | daN.m | |
| Maximum MH | daN.m | |
| Cure State MH-ML | daN.m | |
| Scorch Ts2 | minute | |
| Optimum cure Tc 90 | minute | |
| Cure Rate | daN.m/min | |
| Compression Set | | ASTM D 395 |
| 22H/125° C./25% deflection | % | method B |
| 22H/150° C./25% deflection | % | |
| Hardness, | Shore A | ASTM D2240 |
| Modulus 100% | MPa | ASTM D412 die C |
| Tensile Strength | MPa | ASTM D412 die C |
| Elongation @ break | % | ASTM D412 die C |
| Air Aging 70 hrs @ 125° C. | | ASTM D573 |
| Hardness | Shore A | |
| Tensile Change, % | % | |
| Elong. Change, % | % | |
| Air Aging 70 hrs @ 150° C. | | ASTM D573 |
| Hardness | Shore A | |
| Tensile Change, % | % | |
| Elong. Change, % | % | |
| Tear Resistance | kN/m | ASTM D 624 die C |
| Dynamic Properties | | |
| loss tangent @ +23° C. | % | DMTA @ 1Hz |
| Glass transition temperature | °C. | DMTA @ 1Hz |
| Dynamic Properties compression preload 840N | | MTS |
| Elastic Modulus, K' @ 15Hz | N/mm | |
| Viscous Modulus C @ 15Hz | N.sec./mm | |
| Loss tangent @ 15Hz | % | |
| Elastic Modulus, K' @ 100Hz | N/mm | |
| Viscous Modulus C @ 100Hz | N.sec./mm | |
| Loss tangent @ 100Hz | % | |
| Stiffness ratio K'100Hz/K'15Hz | | |

*Fourier Transform

We have discovered that the inclusion of vinyl or norbornene as the non-conjugated diene component of an ethylene, alpha-olefin, non-conjugated diene, elastomeric polymer portion of an engine mount compound, produces engine mounts having a higher cure rate, generally a lower curative level at constant diene level to attain the same or improved cure state, improved resistance to compression set and improved long term heat aging. Additionally, the ethylene, alpha-olefin, vinyl norbornene, elastomeric polymers of certain embodiments of the present invention on which engine mount compounds are based, will generally have lower levels of diene to achieve similar or improved physical properties when compared to engine mounts parts made from previously available ethylene, alpha-olefin, non-conjugated diene, elastomeric polymers where the non-conjugated diene is selected from the group consisting of 5-ethylidene-2-norbornene, 1,4-hexadiene, 1,6-octadiene, 5-methyl-1,4 hexadiene, 3,7-dimethyl-1,6-octadiene, or combinations thereof The relatively low level of vinyl norbornene can lead to better heat aging, extending the temperature operating range or useful service life of engine mounts based on certain embodiments of the present invention, when compared with engine mounts made from compounds based on elastomeric polymers, either natural or synthetic materials previously available. This feature permits the use of elastomeric polymers such as those described in various embodiments of the present invention in engine mounts over a wide and realistic range of temperatures due to either ambient conditions (generally the low temperature requirement) or increased under the hood temperatures and for long useful part life. The engine mount made of the elastomeric polymers such as those described in various embodiments of the present invention out performs the previous one made of natural robber for the aging performance: for example, the compression set measured after 22 hours @125° C. or the air aging measured after 3 days at 125° C. The compound made of this elastomeric polymer retains its physical and set properties even up to about 150° C.

The ability to combine engine mount compounds which have improved processability, generally leading to more consistent and smoother batches, lower molding cycle times combined with improved physical properties, such as, for instance, wider operating temperature range and generally no diminution of other important characteristics such as resilience, has heretofore been generally difficult to attain. The compound made of this polymer have similar Mooney viscosity to a typical compound made of natural robber.

Engine mounts manufactured with compounds based on the polymers of various embodiments of the present invention will include ingredients that will be well known to those of ordinary skill in the art. Such ingredients include but are not limited to carbon black or other reinforcing fillers, plasticizers, process aids, waxes, antioxidants, accelerators, curatives, and the like. In particular the compound is cured with peroxide to offer the best of the aging and service at elevated temperature. The natural rubber compounds are generally sulfur cured due to the nature of the molecule containing 1 double bond each 4 carbons of the main molecular chain.

Included in the vibration dampening parts contemplated by various embodiments of the present invention are engine mounts, transmission mounts, chassis/suspension insulators, and other elastomeric parts or elastomeric parts combined with other materials such as metal, or plastic composite materials which will be known to those of ordinary skill in the art. The combinations may also include combinations of either elastomers, or elastomers and one or more of hydraulic or pneumatic damping mechanisms.

Also contemplated are elastomeric polymer blends of ethylene, alpha-olefin, vinyl norbornene elastomeric polymers with other polymers, including but not limited to natural rubber, other ethylene, alpha-olefin, non-conjugated diene elastomeric polymers, butadiene rubbers, combinations thereof and the like.

The Ethylene, Alpha-Olefin, Vinyl Norbornene, Elastomeric Polymer Component

The ethylene, alpha-olefin, non-conjugated diene, elastomeric polymer component contains ethylene in the range of from about 40 to about 90 mole (35–85 wt) percent ethylene, preferably in the range of from about 50 to about 70 mole percent, more preferably in the range of from about 50 to about 65 mole percent based on the total moles of the polymer. The ethylene, alpha-olefin, non-conjugated diene, elastomeric polymer contains, in range of about 0.2 to about 5.0 mole (0.7–15 wt) percent of vinyl norbornene, preferably in the range of from about 0.2 to about 3.0 mole percent, more preferably in the range of from about 0.2 to about 2.0 mole percent, most preferably in the range of from about 0.4 to about 1.5 mole percent. The balance of the ethylene, alpha-olefin, non-conjugated diene, elastomeric polymer will generally be made up of an alpha-olefin, selected from the group, consisting of propylene, 1-butene, 1-hexene, 4-methyl-1 pentene, 1-octene, 1-decene, combinations thereof and the like, the preferred alpha-olefin is propylene. The elastomeric polymer will have a Mooney viscosity measured without oil in the polymer, generally in the range of from about ML 1+4, 125° C.=80. to about MST(5+4), 200° C.=90, preferably in the range of from about ML80 to about MST60, more preferably in the range of from about ML80 to about MST50. MST values above 90 are also contemplated as long as the polymer is substantially gel free. The polymer will have a branching index (BI) generally in the range of from about 0.1 to about 0.6, preferably in the range of from about 0.1 to about 0.4, more preferably in the range of from about 0.1 to about 0.3. The elastomeric polymer will have a $M_{w'GpC,LALLS}/M_{n'GPC,DRi}$ (defined herein) above about 6, preferably above about 8, more preferably above about 15.

Other Engine Mount Compound Ingredients

Carbon black used in the reinforcement of rubber ingredient, level ranging from 15 to 150 parts per hundred of rubber(phr), generally produced from the combustion of a gas or an hydrocarbon feed and having a particle size from 20 nm to 100 nm for the regular furnace or channel black or from 150 to 350 nm for the thermal black.

Plasticizer like paraffinic oil are added to the compound to obtain the low hardness required for soft elastic properties and good resilience. The paraffinic oil has generally a viscosity comprised between 30 and 500 cSt at 40° C. and typically contains between 25 and 35% of naphetenic carbon, 60 and 70% of paraffinic carbon and 0 to 5% of aromatic carbon. A naphetenic process oil can be an alternative in the same range of viscosity, containing 25 to 35% of naphetenic carbon, 50 to 65% of paraffinic carbon, 5 to 20% of aromatic carbon. The usual content of process oil is ranging from 5 phr to 100 phr. Some of this oil might be included in the elastomeric polymer if it is an oil extended type.

Process aid can be a mixture of fatty acid ester or calcium fatty acid soap bound on a mineral filler. They are used to help the mixing and the injection at a content of 2 to 5 phr.

Other types of process aid can be low molecular weight polyethylene (copolymer) wax or paraffin wax. Level may range from 0.5 phr to 5 phr.

Antioxidants can be added to improve the long term heat aging, for instance a quinoline (TriMethylQuinoline) and imidazole (Zinc2-MercaptoToluylImidazole). Level ranges from 0.5 phr to 5 phr.

Coagents are those used to improve the peroxide cross link density by acting through an addition mechanism like sulfur, thiuram (TetraMethylThiuramDisulfide or DiPentamethyleneThiuramTetrasulfide) (0.3 phr typically) or methacrylate (EthyleneDiMethaAcrylate or TriMethylolPropaneTriMethacrylate) and maleimide (HVA 2-m-phenylenedimaleimide) (0.5 to 5 phr typically). Or acting by transfer mechanism like the 1,2 polybutadiene and the alkyl cyanurate (TriAllylCyanurate) (typically 0.5 to 5 phr).

Curative(s)

Natural rubber is vulcanized in this example by a combination of Sulfur, Cyclohexyl BenzothiazylSulfenamide (CBS) and a retarder to control the scorch time (Cyclohexylthio Phtalimide-PVI)

To resist to high temperature, peroxides are used to cure the ethylene, alpha-olefin, vinyl norbornene, elastomeric polymer and the most commonly used are the butyl peroxy benzene, butyl peroxy-hexane, dicumyl peroxide, butyl peroxy-valerate, butyl peroxy methyl-cyclohexane combinations thereof, and the like. Typical quantity ranges from 1 phr to 5 phr calculated on a 100% active base.

| Compound Characteristics | | | |
|---|---|---|---|
| INGREDIENTS | PHR | INGREDIENTS | PHR |
| Elastomeric Polymer | 100 | Natural Rubber SMR20 | 100 |
| Paraffinic oil Flexon ® 815 | 75 | Paraffinic oil Flexon 815 | 1.5 |
| Carbon Black N550 | 70 | Carbon Black N550 | 27 |
| Process Aid Struktol ® WB 212 | 3 | Zinc Oxide | 5 |
| Antioxidant Flectol ® H | 0.4 | Stearic Acid | 1 |
| Antioxidant ZMTI | 0.6 | Antioxidant Flectol ® H | 2 |
| Coagent TMPT Sartomer ® 350 | 3 | Sulfur | 1 |
| Peroxide Vulkup ® 40 KE | 6 | CBS | 2 |
| | | PVI | 0.1 |

15 to 75 phr of the process oil mentioned in the table may already be included in the EPDM polymer.

Compounds of the above formulation, where the ethylene, alpha-olefin, non-conjugated diene elastomeric polymer include vinyl norbornene, will have a:

a) a Mooney viscosity ML 1+4 100° C. up to about 80, preferably up to about 60 more preferably up to about 55, most preferably up to about 50;

b) a maximum cure state, MH-ML of at least about 50 daN.m, preferably at least about 60 daN.m, more preferably at least about 70 daN.m, most preferably at least about 75 daN.m;

c) a cure rate of at least about 10 daN.m/min. preferably at least about 15, more preferably at least about 20 daN.m/min.;

d) modulus at 100% elongation of up to about 3 MPa, most preferably up to 2.5 MPa, even more preferably up to about 2.0 MPa; most preferably up to 1.5 MPa, e) compression set at 22 hours (22H) at 125 ° C./25% deflection up to about 20%, preferably up to about 15%, more preferably up to about 10%, most preferably up to about 5%.

f) compression set at 22 hours (22H) at 150 ° C./25% deflection up to about 25%, preferably up to about 20%, more preferably up to about 15%, most preferably up to about 10%;

g) a loss tangent measured by compression, below about 0.25 at room temperature, and 15 Hz, preferably 0.20, most preferably 0.18 most preferably 0.17;

h) a loss tangent measured by compression, below about 0.25 at room temperature at 100 Hz, preferably 0.20, more preferably 0.18 most preferably 0.12;

i) a loss tangent measured by compression, below about 0.20 and +80° C. and 15 Hz, more preferable 0.18 most preferably 0.16;

j) a loss tangent measured by compression, below about 0.20 at +80° C. and 100 Hz, preferably 0.18 most preferably 0.16;

k) a loss tangent measured by compression, below about 0.20 at +125° C. and 15 Hz, preferably 0.18, more preferably 0.16 most preferably 0.14;

l) a loss tangent measured by compression, below about 0.20 at +125° C. and 100 Hz, preferably 0.18, more preferably 0.16 most preferably 0.14;

m) a glass transition temperature, preferably at −40° C., more preferably −42° C., most preferably −44° C.;

n) an elastic modulus at room temperature up to about 1000 N/mm at 15 Hz, preferably 900N/mm, more preferably 850N/mm, most preferably 800N/mm;

o) an elastic modulus at room temperature up to about 1200N/mm at 100 Hz, preferably 1100N/mm, more preferably 1000N/mm, most preferably 900N/mm;

p) a viscous modulus at room temperature below about 2.0N. sec/mm at 15 Hz, preferably 1.7N. sec/mm, more preferably 1.5N.sec/mm;

q) a viscous modulus at room temperature below about 0.30N. sec/mm at 100 Hz, preferably 0.25N.sec/mm, more preferably 0.20N.sec/mm, most preferably 0.15N.sec/mm, r) an elastic modulus at +80° C. up to about 700N/mm at 15 Hz, preferably 600N/mm, more preferably 500N/mm, most preferably 400N/mm;

s) an elastic modulus at +80° C. up to about 800N/mm at 100 Hz, preferably 700N/mm, more preferably 600N/mm, most preferably 500N/mm;

t) a viscous modulus at +80° C. below about 1.50N. sec/mm at 15 Hz, preferably 1.30N.sec/mm, more preferably 1.10N.sec/mm, most preferably 1.00 N. sec./mm;

u) a viscous modulus at +80° C. below about 0.35N. sec/mm at 100 Hz, preferably 0.30N.sec/mm, more preferably 0.25N. sec/mm, most preferably 0.20N.sec/mm P1 v) an elastic modulus at +125° C. up to about 700N/mm at 15 Hz, preferably 600N/mm, more preferably 500N/mm, most preferably 400N/mm;

w) an elastic modulus at +125° C. up to about 800N/mm at 100 Hz, preferably 700N/mm, more preferably 600N/mm, most preferably 500N/mm;

x) a viscous modulus at +125° C. below about 1.30N. sec/mm at 15 Hz, preferably 1.1N. sec/mm, more preferably 0.80N. sec/mm, most preferably 0.70N.sec./mm;

y) a viscous modulus at +125° C. below about 0.20N. sec/mm at 100 Hz, preferably 0.25N. sec/mm, more preferably 0.20N. sec/mm, most preferably 0.15N.sec/mm Method of Producing ethylene, alpha-olefin, non-conjugated diene, elastomeric polymer Component The Ziegler polymerization of the pendent double bond in vinyl norbornene incorporated in the polymer backbone is believed to produce a highly branched ethylene, alpha-olefin, non-conjugated diene, elastomeric polymer. This method of branching permits the production of ethylene, alpha-olefin, non-conjugated diene, elastomeric polymers substantially free of gel which would normally be associated with cationically branched ethylene, alpha-olefin, non-conjugated diene, elastomeric polymer elastomers containing, for instance, Ethylidene norbornene as the termonomer. The synthesis of substantially gel-free ethylene, alpha-olefin, non-conjugated diene, elastomeric polymer containing vinyl norbornene is discussed in Japanese laid open patent applications JP 151758, and JP 210169.

Preferred embodiments of the aforementioned documents to synthesize polymers suitable for this invention are described below:

The catalyst used are $VOCl_3$ (vanadium oxytrichloride) and $VCl_4$ (vanadium tetrachloride) with the later as the preferred catalyst. The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL). As shown in FIG. (1), the choice of co-catalyst influences the compositional distribution in the polymer. The polymer with broader compositional distribution is expected to provide worse low temperature properties. The polymerization is carried out in a continuous stirred tank reactor at 20°–65° C. at a residence time of 6–15 minutes at a pressure of 7 kg/cm2. The concentration of vanadium to alkyl is from 1 to 4 to 1 to 10. About 0.3 to 1.5 kg of polymer is produced per gm of catalyst fed to the reactor. The polymer concentration in the hexane solvent is in the range of 3–7% by weight. Other catalysts and co-catalysts contemplated are discussed in the two Japartese laid open patent applications incorporated by reference above.

The resulting polymers had the following molecular characteristics:

The intrinsic viscosity measured in decline at 135° C. were in the range of 0.5–3.0 dl/g. The molecular weight distribution ($M_{w'GPC,LALLS}/M_{n'GPC/DRI}$) is greater than or equal to 6. The branching index was in the range 0.1–0.3.

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating artion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these U.S. documents are incorporated by reference for purposes of U.S. patent practice.

For peroxide cure applications, vinyl norbornene containing ethylene, alpha-olefin, non-conjugated diene polymers require lower levels of peroxide to attain the same cure state compared to ethylene, alpha-olefin, non-conjugated diene polymers, with, for example, ethylidene norbonene termonomer. Typically 20 to 40% lower peroxide consumption can be realized using ethylene, alpha-olefin, vinyl norbornene elastomeric polymers at constant diene level. The efficiency of vinyl norbornene in providing high cross link density with peroxide vulcanization also permits a reduction in the overall diene level necessary to generally attain the same cure state as ethylidene norbornene polymers. This results in enhanced heat aging performance, generally owing to lower diene incorporation. This unique combinations of improved processability, lower peroxide usage and enhanced heat aging are the benefits provided by ethylene, alpha-olefin, vinyl norbornene elastomeric polymer over conventional non-conjugated dienes such as ethylidene norbornene or 1–4, hexadiene or the like including terpolymer or tetrapolymers.

The relative degree of branching in ethylene, alpha-olefin, non-conjugated diene elastomeric polymer is determined using a branching index factor. Calculating this factor requires a series of three laboratory measurements[1] of polymer properties in solutions. These are:

[1] VerStrate, Gary "Ethylene-Propylene Elastomers", *Encyclopedia of Polymer Science and Engineering*, 6, 2nd edition, (1986)

(i) weight average molecular weight measured using a low angle light scattering (LALLS) technique ($M_w$,LALLS);

(ii) weight average molecular weight ($M_w$,DRI) and viscosity average molecular weight ($M_n$,DRI) using a differential refractive index detector (DRI) and (iii) intrinsic viscosity (IV) measured in decalin at 135° C. The first two measurements are obtained in a GPC using a filtered dilute solution of the polymer in tri-chloro benzene.

An average branching index is defined as:

$$BI = \frac{M_{v,br} \times M_{w\,DRI}}{M_{w,LALLS} \times M_{v\,DRI}} \quad (1)$$

where, $M_{v,br} = k(IV)^{1/a}$,
and 'a' is the Mark-Houwink constant (=0.759 for EP(D)M in decalin at 135° C.).

From equation (1) it follows that the branching index for a linear polymer is 1.0, and for branched polymers the extent of branching is defined relative to the linear polymer. Since at a constant $M_n$, $(Mw)_{branch} > (Mw)_{linear}$, BI for a branched polymers is less than 1.0, and a smaller BI value denotes a higher level of branching. It should be noted that this method indicates only the relative degree of branching and not a quantified amount of branching as would be determined using direct measurments, i.e. NMR.

Another method of measuring branching and its effect on molecular weight distribution is through the use of Mooney Relaxation area (MLR) (ASTM1646). At a constant Mooney, MLR is sensitive to branching and molecular weight distribution. More branched and/or broader molecular weight distribution polymers have a higher MLR, when compared at the same Money viscosity.

The synthesis of ethylene, alpha-olefin, vinyl norbornene elastomeric polymer polymers were conducted in a laboratory pilot unit (output about 4 kS/day)

EXAMPLES

Example 1

Example 1 shows a method of polymerizing ethylene, propylene, and vinyl norbornene, using $VCl_4$ catalyst and EASC (Ethyl Aluminium Sesqui Chloride) cocatalyst.

Ethylene is present at 50 weight percent. Vinyl norbornene is present at 2.6 weight percent. The remainder of the terpolymer is made up of propylene. The polymer with 39 parts per 100 of rubber (phr) has a Mooney viscosity ML 1+4, 125° C. of 49 and a Mooney relaxation MLR of 990, showing a high level of branching. This ethylene, alpha-olefin, vinyl norbornene elastomeric polymer is extended by 39 parts paraffinic oil for 100 parts of rubber to ease its processing at the manufacturing and compounding stages. The reason is related to the high molecular weight of the ethylene, alpha-olefin, ethylidene norbornene elastomeric polymer selected in this application.

Examples 2–5

Examples 2–5 utilized the elastomer of Example 1 as well as a commercially available, elastomeric polymer (Vistalon® 3666 available from Exxon Chemical Company). Vistalon 3666 has an ethylene content of approximately 58 weight percent, an ethylidene norbornene content of approximately 4.5 weight percent, with the remainder being propylene. This elastomeric polymer has a typical Mooney Viscosity ML 1+4, 125° C. of 52 and a typical MLR of 600. This elastomeric polymer is extended with 75 phr of a paraffinic oil for 100 phr of rubber to ease the processing. As a reference we also use a standard compound based on Natural Rubber (NR) typical of the today mounts used in a car today. The NR is the type SMR 20, i.e Standard Malaysian Rubber grade 20 having a typical Mooney Viscosity ML 1+4, 100° C. of 65 and a Plasticity Retention Index of 40%. All the materials are compounded as shown in Table I. Physical properties are then run on the 4 samples, including Mooney viscosity, scorch time, and oscillating disk rheometer (ODR) data. The conditions of blending the compounds for Examples 2–5 are shown in Table II. As can be seen from Table II, processability during the compounding step of Examples 3,4 and 5 are acceptable, offering a smooth handling on open mill and easy sheet off for preparing the strip shape necessary to feed the injection press. Those of Example 2 are generally less than acceptable due to the crumbling appearance of the batch which gives a hard time to the operator when handling it on the open mill, showing high bagging, difficult knife cutting and difficult sheet off. As can be seen from the Mooney viscosity of the compounds in Table III, compound (Example 3) based on ethylene, alpha-olefin, vinyl norbornene, elastomeric polymer has substantially lower Mooney viscosity measured at 100° C., generally translating into improved ease of processability both in the compounding step and the step of injecting the materials into a mold. There is limited difference with the natural rubber compound shown in the example 5. The commercially available elastomeric polymer, shown as Example 2 has nearly an order of magnitude higher Mooney viscosity indicating a much stiffer compound difficult to move or inject.

The cure characteristics measured by the oscillating disk rheometer (Monsanto ODR 2000E at 180° C., ±3° arc) show the higher cure state of the vinyl norbornene ethylene, propylene elastomeric polymer based compound as measured by the difference MH-ML. The cross link density is more effective with these types of polymers. The cure rate measured with the same apparatus describes the speed of formation of carbon to carbon cross link through radical species and shows the advantage of the ethylene, alpha-olefin, vinyl norbornene elastomeric polymer vs. the ethylene, alpha-olefin, ethylidene norbonene elastomeric polymer. It is an advantage for the rubber compounder to have high cure rate to increase productivity.

Turning to Table III where the physical properties of the elastomeric compounds measured on pads defined by the ASTM D 412 which were cured in a laboratory electrical press for 10 minutes at 180° C.

As in Table III, demonstrated at an equivalent hardness, the modulus of the vinyl norbornene polymers is generally higher than the modulii of the ethylidene norbornene containing polymers. It is a characteristic typical of a higher cure state. Since the engine mount application requires a low modulus, the ethylene, alpha-olefin, vinyl norbornene elastomeric polymer requires less curing agent like the peroxide should have been to control the Modulus 100% as well the elongation at break. The tensile strength of Examples 2 and 3 are generally lower than those examples made with ethylidene norbornene, since the cure state looks tighter, shortening the elongation at break and therefore the tensile strength occurs in an early stage of the elongation, limiting its value. The air aging data show among other things that the two vinyl norbornene containing polymers, Examples 2 and 3, generally do not lose properties after air aging. At these aging temperatures, the natural rubber compound cannot be considered as an elastic material after 70 hours at 125° C. since its residual elastic energy (Tensile Strength× Elongation at break) dropped below 10% of its original value. Also noted is the compression set of the materials which indicates good resistance to deformation, which is critical of the application. Even at that low level of compression set, we see a large improvement not only vs. the natural rubber but also vs. the ethylene propylene ethylidene norbornene elastomefic polymer highligthing the stability of the crosslink and the high resiliency of this type of polymer.

The low temperature properties have been determined through the measure of the glass transition temperature of the compound by a method using the Dynamic Mechanical Thermal Analyzer (DMTA). It measures the dynamic loss tangent of the cured rubber in a dual cantilever bending mode with a shear oscillation of 1 Hz at an amplitude of 0.62 mm over a range of temperature from −70° C. and +150° C., ramping at 2° C./minute. The result shows that the best of the ethylene, alpha-olefin, ethylidene norbornene, elastomeric polymer still has a tan δ peak at a higher temperature (−43.4° C.) than the ethylene, alpha-olefin, vinyl norbornene elastomeric polymer (−44.6° C.). This demonstrates that the ethylene, alpha-olefin, vinyl norbornene elastomeric polymer offers a lower temperature flexibility to the mount, being even closer to the natural rubber compound (−46.7° C.)

In reviewing these data, the compound viscosity (ML (1+4) 100° C.) of the ethylene, alpha-olefin, non-conjugated diene elastomefic polymer compound of Example 2 is well over 50% higher than the natural rubber comparative example. But the ethylene, alpha-olefin, vinyl norbornene elastomeric polymer based compound is is the range of the natural rubber reference. So the ethylene, alpha-olefin,vinyl norbornene elastomeric polymer compound is expected to process as well as the natural robber compound, wiring and molding. The ethylene, alpha-olefin, ethylidene norbornene elastomeric polymer has not this ability.

As seen by the MH-ML data, the natural rubber gives a slightly tighter; or fuller more complete cure than the ethylene, propylene, ethylidene norbornene elastomeric polymer recipes of Example 2.

The cure rate of the natural rubber compound, because of the number of double bonds present in the molecule and because of the sulfur cured system is by far faster than any of the peroxide cured ethylene, alpha-olefin, non-conjugated diene elastomeric polymer compound.

Tear resistance measured according to the ASTM Die C shows a performance in favour of natural rubber, attributable to the sulfur cure system, but the performance obtained by ethylene, alpha-olefin, vinyl norbornene elastomeric polymer compound meet generally the specifications of the industry and could be improved by formula optimization of this compound.

Compression set of the two ethylene, alpha-olefin, non-conjugated diene elastomeric polymer examples is a significant improvement over natural rubber. At the temperature of 125° C., the natural rubber has a compression set above 50%, which means that the compound has lost most of its elastic properties, whereas the ethylene, alpha-olefin, non-conjugated diene elastomeric polymer compounds have a very good set, even better for the ethylene, alpha-olefin, vinyl norbornene elastomeric polymer. The trend is confirmed by the test carried out at 150° C.

Further, the air aging of the ethylene, alpha-olefin, non-conjugated diene elastomeric polymer samples is substantially improved over the natural rubber part. After aging 3 days 125° C., the natural rubber compound has a residual elastic energy (aproximatively tensile strength x elongation at break) value which falls below 10% of the original value, so the compound cannot be considered anymore as an elastic material. The ethylene, alpha-olefin, non-conjugated diene elastomeric polymer material has almost no change in physical properties.

However, the resilience or loss tangent of the ethylene, alpha-olefin, non-conjugated diene elastomeric polymer samples is higher than the natural rubber due to a much higher viscous modulus and a slightly higher elastic modulus.

Dynamic measurements for Examples 2, 3, 4 & 5 were performed on a Dynamic Characterization Test ware™ "MTS" model 790.31. Test conditions were: dense rubber part of dimension 40×40×20 mm. compression molded and press cured for 10 minutes at 180° C.

A compression preload of 800N is applied on the part, after a precompression of 40N as "0" setting. The test runs for 300 seconds as stabilization and then about 300 seconds as actual measurement.

The deformation is exerted on the part at a frequency of 15 Hz with an amplitude of 0.5 mm. The elastic modulus (K' in N/mm), the viscous modulus (C in N. sec./mm) and the loss tangent are reported.

At 100 Hz, the applied deformation is 0.05 mm. Same results are reported. The dynamic test results are reported in Table IV for ambiant (26° C.), in table V for 80 and in table VI for 125° C.

The same series of tests are repeated, aging the part at 125° C. for 1 week, 3 weeks and 6 weeks (or 1000 hours) resulting in the a stiffer natural rubber part (higher loss tangent st a high frequency), while the vinyl norbordene elastomeric polymer loss tangent is stable.

The results show that the ethylene, alpha-olefin, vinyl norbornene elastomeric polymer, because of its tighter cure state has a higher damping than the ethylene, alpha-olefin, ethylidene norbornene elastomeric polymer, both elastic(K') and viscous modulus (C) are increased.

The loss tangent is more constant over the tested range of temperature with the ethylene, alpha-olefin, non-conjugated diene elastomeric polymer compound than the natural rubber compound. Between ambiant and 80° C., the natural rubber tangent δ decreases by 18% whereas ethylene, alpha-olefin, ethylidene norbornene elastomeric polymer does not change and the ethylene, alpha-olefin, vinyl norbornene elastomeric polymer drops by 3%. Between ambiant temperature and 120° C., the natural rubber tangent δ drops by 38%, whereas the ethylene, alpha-olefin, ethylidene norbornene elastomeric polymer decreases by less than 9% and the ethylene, alpha-olefin, vinyl norbornene elastomeric polymer by 20%.

Also at ambiant temperature, the natural rubber has a different tangent δ value between 15 Hz and 100 Hz of 35% increase, whereas the ethylene, alpha-olefin, ethylidene norbornene elastomeric polymer decreases by 16% and the ethylene, alpha-olefin, vinyl norbornene elastomeric polymer by 13%.

After aging at the temperature encountered under hood, the expected service life of the ethylene, alpha-olefin, non-conjugated diene elastomeric polymer part is extended by far.

Conclusion

The present invention has been described in considerable detail with reference to certain preferred versions thereof, other versions are possible. For example, while engine mounts have been exemplified, other vibration damping devices are contemplated. Therefore, the spirit and scope of the appended claims should not be limited to the description of the preferred versions contained herein.

TABLE I

| Master Batch | Example 2 EPDM-ENB | Example 3 EPDM-VNB | Example 4 EPDM-VNB | Example 5 N.R |
|---|---|---|---|---|
| Polymer | 175 | 140 | 140 | 100 |
| FEF N-550 | 70 | 70 | 50 | 27 |
| Flexon 815 | 0 | 35 | 5 | 1.5 |
| Struktol WB 212 | 3 | 0 | 0 | 1 |
| ZMTI | 0.6 | 0.6 | 0.6 | 0 |
| Flectol H | 0.4 | 0.4 | 0.4 | 2 |
| Zinc Oxide | | | | 5 |
| Stearic Acid | | | | 1 |
| Sartomer 350 | 3 | 3 | 3 | 0 |
| Sulfur | | | | 1 |
| CBS | | | | 2 |
| PVI | | | | 0.1 |
| Vulkup 40KE | 6 | 6 | 3 | |
| Total PHR | 258 | 255 | 201 | 139.6 |
| Mooney Viscosity ML (1 + 4), 100° C. | 70 | 45 | 67 | 51 |
| Scorch Ms 125° C. | | | | |
| Viscosity, MU | 27 | 16 | 24 | 21 |
| T5, minute | 19 | 19 | 30 | 32 |
| ODR 3° arc, 180° C. | | | | |
| ML daN.m | 16 | 9 | 14 | 13 |
| MH daN.m | 62 | 62 | 67 | 73 |
| MH-ML daN.m | 46 | 53 | 53 | 60 |
| Ts2, minute | 0.8 | 0.9 | 1.1 | 1.3 |
| T90, minute | 4 | 4.6 | 4.9 | 2.6 |
| Cure rate daN.m/min | 18 | 21 | 17 | 120 |

TABLE II

| No. | Example 2 | Example 3 | Example 4 | Example 5 |
|---|---|---|---|---|
| ML 1 + 4, 125° C. | 52 | 49 | 49 | 65 |
| Ethylene | 58 | 50 | 50 | N.A |
| ENB, % | 4.5 | N.A | N.A | N.A |
| VNB, % | N.A | 2.6 | 2.6 | N.A |
| MLR | 600 | 990 | 990 | |
| Oil extension, phr | 75 | 39 | 39 | 0 |
| Mixing | | | | |
| Dump Time, sec. | 260 | 210 | 240 | 260 |
| Dump Temp, °F. | 190 | 200 | 200 | 210 |
| Processing | − | + | − | + |
| Comments | crumbling | smooth/easy | dry | OK |

TABLE III

| No. | Example 2 | Example 3 | Example 4 | Example 5 |
|---|---|---|---|---|
| Physical Properties, press cured 5 min. @ 180° C. | | | | |
| Hardness, shore A | 50 | 51 | 51 | 47 |
| 100% Modulus, MPa | 1.2 | 2.5 | 1.6 | 1.3 |
| Tensile Strength, MPa | 12.8 | 6.5 | 7.5 | 11.3 |
| Elongation @ Break, % | 495 | 200 | 260 | 415 |
| Tear, Die "C", N/mm | 37.9 | 30.6 | 33.2 | 69.8 |
| Air Aging, 70 hrs @ 125° C. | | | | |
| Hardness, Shore A | 50 | 52 | 53 | 48 |
| Tensile Strength, MPa | 14 | 7.0 | 7.0 | 2.6 |
| Elongation @ Break, % | 595 | 220 | 270 | 160 |

TABLE III-continued

| No. | Example 2 | Example 3 | Example 4 | Example 5 |
|---|---|---|---|---|
| Air Aging, 70 hrs @ 150° C. | | | | |
| Hardness, Shore A | 55 | 55 | 54 | N.A |
| Tensile Strength, MPa | 12.7 | 7.5 | 8.2 | N.A |
| Elongation @ Break, % | 510 | 220 | 270 | N.A |
| Compression Set, 25% deflection | | | | |
| 22 hrs/125° C. | 12 | 5 | 5 | 52 |
| 22 hrs/150° C. | 13 | 8 | 12 | N.A |

TABLE IV

| Dynamic Properties | Example 2 | Example 3 | Example 4 | Example 5 |
|---|---|---|---|---|
| 15Hz - temperature 26° C. | | | | |
| K' - N/mm | 685 | 783 | 751 | 492 |
| C - N.sec/mm | 0.99 | 1.46 | 1.34 | 0.24 |
| Tangent δ | 0.136 | 0.176 | 0.169 | 0.045 |
| 100 Hz - temperature 26° C. | | | | |
| K' - N/mm | 904 | 1066 | 1012 | 522 |
| C - N.sec/mm | 0.16 | 0.26 | 0.22 | 0.06 |
| Tangent δ | 0.114 | 0.153 | 0.138 | 0.070 |
| Stiffness ratio $K'_{100}/K'_{15}$ | 1.32 | 1.36 | 1.35 | 1.06 |

TABLE V

| Dynamic Properties | Example 2 | Example 3 | Example 4 | Example 5 |
|---|---|---|---|---|
| 15Hz - temperature 80° C. | | | | |
| K' - N/mm | 539 | 559 | 579 | 463 |
| C - N.sec/mm | 0.77 | 1.01 | 1.00 | 0.18 |
| Tangent δ | 0.135 | 0.170 | 0.163 | 0.037 |
| 100 Hz - temperature 80° C. | | | | |
| K' - N/mm | 697 | 783 | 766 | 500 |
| C - N.sec/mm | 0.13 | 0.21 | 0.19 | 0.03 |
| Tangent δ | 0.120 | 0.165 | 0.159 | 0.042 |
| Stiffness ratio $K'_{100}/K'_{15}$ | 1.29 | 1.40 | 1.32 | 1.08 |

TABLE VI

| Dynamic Properties | Example 2 | Example 3 | Example 4 | Example 5 |
|---|---|---|---|---|
| 15Hz - temperature 125° C. | | | | |
| K' - N/mm | 508 | 475 | 513 | 493 |
| C - N.sec/mm | 0.67 | 0.71 | 0.76 | 0.15 |
| Tangent δ | 0.124 | 0.140 | 0.139 | 0.028 |
| 100 Hz - temperature 125° C. | | | | |
| K' - N/mm | 635 | 613 | 659 | 529 |
| C - N.sec/mm | 0.12 | 0.14 | 0.15 | 0.02 |
| Tangent δ | 0.124 | 0.146 | 0.145 | 0.029 |
| Stiffness ratio $K'_{100}/K'_{15}$ | 1.25 | 1.29 | 1.28 | 1.07 |

We claim:

1. A vehicle part comprising an ethylene, α-olefin, vinyl norbornene elastomeric polymer; wherein said elastomeric polymer:
   a) includes ethylene in the range of from about 40 to about 90 mole %;
   b) includes vinyl norbornene in the range of from about 0.2 to about 5.0 mole %;
   c) has a branching index in the range of from about 0.1 to about 0.6; and
   d) has a Mooney viscosity ML (1+4), 125° C. from about 80 to MST (5+4),200° C. up to 90;
wherein a compound including said ethylene, α-olefin, vinyl norbornene elastomeric polymer has:
   i) ML 1+100° C. up to about 80;
   ii) MH-ML above about 50 daN.m;
   iii) cure rate of at least about 15 daN.m/min.;
   iv) 100% modulus of up about 3 MPa;
   v) compression set 22H/125° C. / 25% deflection up to about 20%;
   vi) compression set 22H/150° C./25% deflection up to about 25%;
   vii) loss tangent below about 0.2 at +26° C.;
   viii) loss tangent below about 0.2 at +80° C.;
   ix) loss tangent below about 0.2 at +125° C.;
   x) a glass transition temperature of about −40° C. measured by DMTA (Dynamic-mechanical-thermal analyser) machine@1 Hz.

2. The vehicle part of claim 1 wherein said ethylene, α-olefin, vinyl norbornene polymer includes ethylene in the range of from about 50 to about 70 mole percent, and said vinyl norhomeric being present in the range of from about 0.2 to about 3 mole percent, said mole percents based on the total moles of said ethylene, alpha-olefin, vinyl norbornene polymer.

3. The vehicle part of claim 1 wherein said ethylene, alpha-olefin, vinyl norbornene polymer includes ethylene in the range of from about 50 to about 65 mole percent, and vinyl norbornene in the range from about 0.2 to about 2 mole percent, based on the total moles of the elastomeric polymer.

4. The vehicle part of claim 1 wherein said ethylene, alpha-olefin, vinyl norbornene polymer includes ethylene in the range of from about 50 to about 65 mole percent, and vinyl norbornene in the range from about 0.4 to about 1.5 mole percent, based on the total moles of the polymer.

5. The vehicle part of claim 4 wherein said alpha-olefin is propylene.

6. The vehicle part of claim 4 wherein said compound has:
   a) ML 1+4 100° C. up to about 60;
   b) cure rate at least about 20 daN.m/min.;
   c) 100% modulus up to about 1.5 MPa; and
   d) compression set up to about 22H/125° C./25% deflection up to about 10%.

7. The vehicle part of claim 1 wherein said vehicle part is selected from the group consisting of engine mounts, transmission mounts, chassis/body insulators, and combinations thereof.

8. The vehicle part of claim 1 wherein said vehicle part is an engaging mounts, wherein said engine mount further includes an additional vibration dampening device selected from the group consisting of hydraulic, pneumatic mechanical devices, and combinations thereof.

9. A vehicle engine mount comprising an ethylene, propylene, vinyl norbornene elastomeric polymer wherein;
   a) said ethylene is present in the said polymer in the range from about 50 to about 65 mole percent, and said vinyl norbornene is present in said polymer in the range from about 0.4 to about 1.5 mole percent said mole percents based on the total moles of said polymer;
   b) wherein a compound including said elastomeric polymer has:
      i) ML 1+4 100° C. up to about 75;
      ii) MH-ML above about 50 daN.m;
      iii) cure rate of at least about 20 daN.m/min.;
      iv) 100% modulus of up about 1.5 MPa;
      v) compression set 22H/125° C./25% deflection up to about 5%;
      vi) compression set 22H/150° C./25% deflection up to about 10%;
      vii) loss tangent below about 0.17 at 23° C. and 15 Hz;
      viii) loss tangent below about 0.17 at +80° C. and 15 Hz;
      ix) loss tangent below about 0.14 at +125° C. and 15 Hz;
      x) a glass transition temperature of about −44° C. measured by DMTA @1 Hz.

10. A vehicle comprising a vehicle body and vibration damping parts;
   said vibration damping parts including a compound an ethylene, propylene, vinyl norbornene elastomefic polymer, wherein said vibration damping parts are formed from a compound having a Mooney viscosity ML 1+4, 100° C. below about 80, preferably below about 50, said compound having a MH-ML in the range of 40 to 50 daN.m.

* * * * *

UNITED STATES PATENT AND TRADEMARK OFFICE
CERTIFICATE OF CORRECTION

PATENT NO. : 5,571,883
DATED : November 5, 1996
INVENTOR(S) : Eric P. Jourdain, et al.

It is certified that error appears in the above-indentified patent and that said Letters Patent is hereby corrected as shown below:

Column 7, line 1, delete "or"
Column 7, line 19, insert --.-- after the word "thereof"
Column 7, line 34 and Column 15, line 28, replace the word "robber" with --rubber--
Column 8. lines 60, 61, and 63, replace the word "naphetenic" with --naphthenic--
Column 10, line 17, delete "and" before "+80°" and replace with --at--
Column 11, line 8, delete "P1"
Column 12, line 8, replace the word "artion" with --anion--
Column 13, line 29, replace the word "Money" with --Mooney--
Column 13, line 31, delete the word "polymer"
Column 13, line 32, replace "kS" with --kg--
Column 13, line 39, replace "VCL" with --VCL$_4$--
Column 13, line 67, delete the word "today"
Column 14, line 53, delete the phrase "should have been"
Column 16, line 27, delete "a" before the word "stiffer", delete "st" replace with --at--
Column 21, line 16, the expression "ML 1+100° C" should read --ML(1+4) 100° C--
Column 22, line 12, replace the word "engaging" with --engine--

UNITED STATES PATENT AND TRADEMARK OFFICE
CERTIFICATE OF CORRECTION

PATENT NO. : 5,571,883
DATED : November 5, 1996
INVENTOR(S) : Eric P. Jourdain, et al.

It is certified that error appears in the above-indentified patent and that said Letters Patent is hereby corrected as shown below:

Column 22, line 43, replace the word "elastomefic" with —elastomeric—

Signed and Sealed this

Twenty-second Day of April, 1997

Attest:

BRUCE LEHMAN

Attesting Officer

Commissioner of Patents and Trademarks